Jan. 29, 1952     J. H. BATZLE     2,583,806
GARMENT CARRYING RACK FOR AUTOMOBILES
Filed Nov. 8, 1950
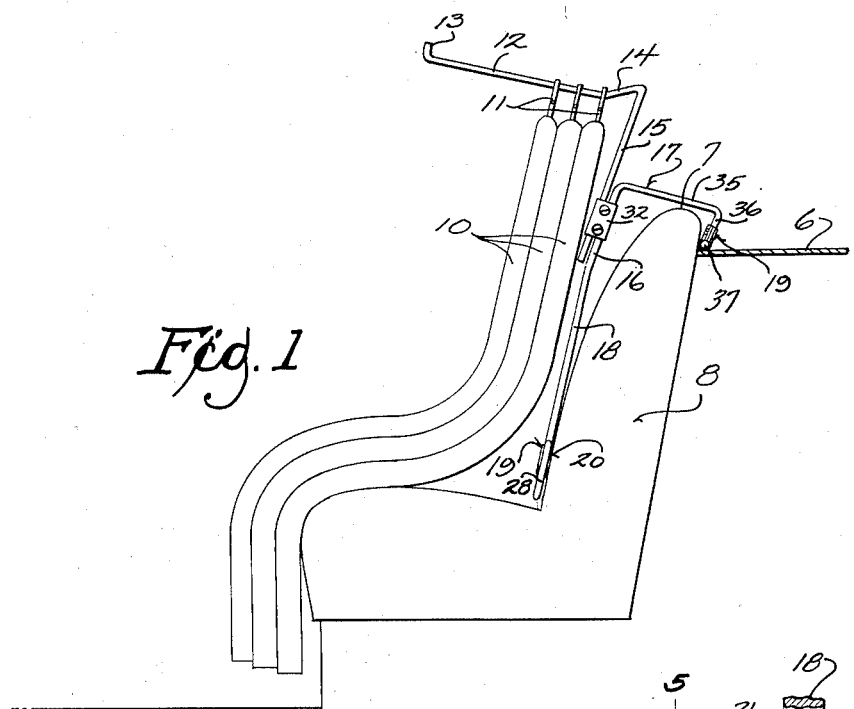
Inventor
JOSEPH H. BATZLE
By Wheeler, Wheeler & Wheeler
Attorneys Patented Jan. 29, 1952

2,583,806

UNITED STATES PATENT OFFICE 2,583,806

GARMENT CARRYING RACK FOR AUTOMOBILES

Joseph H. Batzle, Wauwatosa, Wis.

Application November 8, 1950, Serial No. 194,671

7 Claims. (Cl. 224—29)

This invention relates to a garment carrying rack for private automobiles.

It is the object of the invention to provide a rack of substantially universal application to any automobile for the support of hangers upon which garments may be carried in the vehicle. The invention contemplates a rack which can be inexpensively fabricated of simple parts to provide an elevated bracket arm for the garment hangers, a hook which will hold the bracket arm desirably free of contact with the top of a vehicle seat back, the bracket arm support extending from the hook downwardly across the seat back and provided with a thrust member which is not only of substantial area, but is tiltable to conform to the seat back, regardless of variations in contour.

Another feature of the invention consists in the standardization of clamping means used at various portions of the device and the provision of special features for holding the bracket arm against lateral swaying movement.

In the drawings:

Fig. 1 is a view in side elevation showing my improved garment carrier in use, portions of the shelf behind a vehicle seat being shown in section.

Fig. 2 is a view of the carrier in perspective.

Fig. 3 is a detail view taken on the section indicated at 3—3 of Fig. 2.

Fig. 4 is an enlarged elevational view of a clamp used in assembling the parts of the carrier.

Fig. 5 is a view taken on line 5—5 of Fig. 4.

Practically all vehicles currently have shelves of greater or lesser extent of the general order of that indicated at 6 in Fig. 1, such a shelf being slightly lower than the top portion 7 of the seat back 8.

Diagrammatically illustrated at 10 are the garments to be transported, these being mounted on the usual garment hangers 11 which are hooked over a forwardly projecting bracket arm 12. This bracket arm preferably has a very definite forward and upward inclination as is clearly shown in Fig. 1, its direction of extent being roughly at right angles to the general plane of the seat back 8. At the forward end of bracket arm 12 is an upturned terminal portion 13 which prevents the hangers 11 from sliding off of the arm in the event of a sudden stop. There is also desirably a slight upward inclination of bracket arm 12 at 14 which prevents the hangers from sliding from the rear end of the arm. The bend at 14 communicates with an upright portion 15 of the bracket arm which is clamped to a parallel upright portion 16 of the bracket arm support generically designated by reference character 17.

From the portion 16 of the support, the bar of which the support is formed extends downwardly at 18, its lower end being held by clamp 19 pivotally to a thrust member 20 which rests against the lower forward face of seat back 8. The clamp 19 comprises a pair of plates 21 and 21' having vertical complementary channels at 22, 23 to receive and engage the support bar 18. The plates are clamped upon the bar by the tightening of the bolts 24. At their lower ends, the plates have opposing semi-tubular transverse channels 25, 26 embracing pivotally the rod 27 which forms a part of the thrust member 20. By way of exemplification, this thrust member unitarily comprises a bar formed into the approximate shape of a figure 8 with the intermediate rod portion 27 and arcuate terminal portions 28 and 30, the overall shape of the thrust member being laterally elongated and vertically broad and with rounded corners to distribute the pressure over a large area of the rear seat back without injury thereto.

The clamp which connects the portion 16 of the support with the portion 15 of the bracket is best shown in Figs. 2 and 3 and comprises merely a pair of shallow channels 31 and 32 held together by bolts 33, the bolts being disposed between the bar portions 15 and 16 above described. By loosening the bolts, it is possible to raise or lower the entire bracket respecting the support, in order that the device may be adjusted to the requirements of the garments and the vehicle.

Above the clamp which unites the bracket arm adjustably with the support 17, the support has a generally rearwardly extending portion 35 turned downwardly at 36 at its rear end to provide a hook which passes over the upper end 7 of the seat back 8, preferably, although not necessarily, free of contact therewith. In order to cooperate with the thrust member 20 to hold the support against lateral swinging movement, the end of the hook 36 is preferably provided with a second clamp 19 identical with that already described, and which serves to connect to the hook 36 a stabilizing transverse rod 37 desirably provided at its ends with rubber pads 38 which may conveniently be made by simply slipping short lengths of rubber hose onto the ends of rod 37.

The pads 38 rest on the shelf 6 to carry the weight of the entire apparatus. To the extent that garments hung on the bracket arm 12 tend to oscillate the bracket arm and support about the point of pivotal engagement with shelf 6, the movement is absorbed by the pressure of the thrust member 20 upon the forward surface of seat back 8. The length of the support member locates the thrust element 20 near the bottom of the seat back, thus minimizing the pressure on the cushion. Such pressure is also well distributed about the face of the cushion by the extent, laterally, as well as vertically, of the thrust element 20, distribution of thrust being further affected by the fact that the thrust element is in pivotal connection with the end of support bar 18, thus being able to accommodate itself to the seat back, whatever the contours thereof.

As clearly appears from Fig. 1, the garments mounted on bracket arm 12 will drape neatly downwardly and across the seat with virtually no tendency to become wrinkled in transit. When the device is no longer required, it is an advantageous feature of the present invention that the parts are readily disassembled by loosening the bolts of the respective clamps, withdrawing the upright bracket arm 15 from connection with the support, and similarly disengaging either or both of the thrust element 20 and the cross rod 37 from the support, so that the several parts can all be stored flat until the use of the device is again required.

I claim:

1. A device of the character described for engagement over the back of a vehicle seat to provide supports for the transportation of garments and the like, said device comprising a support having a hook portion and a portion disposed to extend downwardly at the front of a vehicle seat and provided below the hook portion with a transversely extending pressure element of substantial extent to which said support is pivoted and a bracket arm having a clamp adjustably connecting it with said support between the pressure element and the hook portion thereof, said bracket arm extending outwardly and upwardly in a direction forwardly of the seat back.

2. A device of the character described for engagement with the shelf behind a vehicle seat, and with the forward face of the seat back to support garments in transportation, said device comprising a support having a hook portion of such width and depth as substantially to clear the top of a seat back and to engage the shelf behind such back, said support having at its lower end a thrust element positioned for abutment with the forward surface of the seat back, and a bracket arm having a connection with said support and extending upwardly and forwardly from said connection, the connection between the bracket arm and the support comprising a clamp providing for the adjustment of the bracket arm upwardly and downwardly respecting the support.

3. The device of claim 2 in which the thrust element at the lower end of the support has an intermediate portion in pivotal connection with the support whereby to be self-adjusting as to angle to lie flat against the front face of the seat back.

4. The device of claim 3 in which the thrust element comprises a bar in the general form of a figure 8 having an intermediate attaching portion and generally arcuate terminal portions in integral connection, the support having a clamp in pivotal connection with said intermediate portion.

5. The device of claim 4 in which the hook portion of the support terminates in a clamp substantially identical with the clamp last mentioned and is provided with a cross bar engaged by said clamp and seating at its ends against the shelf to resist lateral displacement.

6. A device of the character described comprising in combination a bracket arm having a forwardly extending portion and a generally upright portion and a bend integrally connecting said first mentioned portions and below which the forwardly projecting portion is offset, a support comprising a bar having a generally upright portion, a rearwardly and downwardly extending portion integral therewith comprising a hook, and a portion inclined slightly forwardly from the upright portion first mentioned and extending downwardly therefrom, a pressure element of substantial lateral and vertical extent pivotally connected with said last mentioned support portion, a clamp adjustably connecting the generally upright portion of the support and the bracket arm in substantial parallelism, another clamp at the end of the hook portion of the support, and a cross rod carried by the last mentioned clamp and adapted to resist lateral displacement of the assembly.

7. A clothes hanger carrier for vehicle use and designed for engagement with the shelf behind a vehicle seat, and with the forward face of the seat back to support garments in transportation, said device comprising a support comprising an upright adapted to lie against the seat back and having at its lower end a wide thrust element positioned for flat abutment with the forward surface of the seat back, a hook at the upper end of the upright including a seat back spanning portion and a terminal portion extending down to the shelf and of such length as to hold said spanning portion free of seatback contact, stabilizing arms extending laterally from said terminal portion for shelf engagement to stabilize said support, and a bracket arm having a connection with said support and extending upwardly and forwardly from said connection, said arm having a free end provided with a terminal stop for clothes hangers suspended on the arm.

JOSEPH H. BATZLE.

REFERENCES CITED

The following references are of record in the file of this patent:

UNITED STATES PATENTS

| Number | Name | Date |
|---|---|---|
| 1,688,225 | Belohavek | Oct. 16, 1928 |
| 1,722,122 | Wilson | July 23, 1929 |
| 1,750,435 | Silver | Mar. 11, 1930 |
| 2,255,973 | Hoobler | Sept. 16, 1941 |
| 2,494,318 | Sturk | Jan. 10, 1950 |
| 2,494,581 | Prigg | Jan. 17, 1950 |
| 2,536,765 | North | Jan. 2, 1951 |